United States Patent
Valenzuela

(10) Patent No.: US 11,987,510 B2
(45) Date of Patent: May 21, 2024

(54) PRODUCTION OF H2S FOR EFFICIENT METAL REMOVAL FROM EFFLUENTS

(71) Applicant: 1983 LLC, Tucson, AZ (US)

(72) Inventor: Dania Valenzuela, Tucson, AZ (US)

(73) Assignee: 1983 LLC, Tucson, AZ (US)

( * ) Notice: Subject to any disclaimer, the term of this patent is extended or adjusted under 35 U.S.C. 154(b) by 287 days.

(21) Appl. No.: 17/302,101

(22) Filed: Apr. 23, 2021

(65) Prior Publication Data

US 2021/0331952 A1 Oct. 28, 2021

Related U.S. Application Data

(60) Provisional application No. 63/081,585, filed on Sep. 22, 2020, provisional application No. 63/014,947, filed on Apr. 24, 2020.

(51) Int. Cl.

| | | |
|---|---|---|
| *C02F 1/62* | (2023.01) | |
| *C01B 17/16* | (2006.01) | |
| *C01B 32/50* | (2017.01) | |
| *C02F 1/52* | (2023.01) | |
| *C02F 1/66* | (2023.01) | |
| *C02F 1/68* | (2023.01) | |
| *C02F 1/58* | (2023.01) | |
| *C02F 101/20* | (2006.01) | |
| *C02F 103/10* | (2006.01) | |

(52) U.S. Cl.
CPC ............. *C02F 1/62* (2013.01); *C01B 17/165* (2013.01); *C01B 32/50* (2017.08); *C02F 1/5236* (2013.01); *C02F 1/66* (2013.01); *C02F 1/685* (2013.01); *C02F 1/58* (2013.01); *C02F 2101/20* (2013.01); *C02F 2101/203* (2013.01); *C02F 2103/10* (2013.01); *C02F 2305/00* (2013.01)

(58) Field of Classification Search
CPC .... C02F 1/62; C02F 1/66; C02F 1/685; C02F 1/5236; C02F 2101/20; C02F 2305/00; C02F 1/58; C02F 2101/203; C02F 2103/10; C01B 32/50; C01B 17/165; C01B 17/28; C01D 5/00; C22B 15/0063; C22B 3/00; C22B 3/44
See application file for complete search history.

(56) References Cited

U.S. PATENT DOCUMENTS

| | | | | |
|---|---|---|---|---|
| 1,407,324 A | * | 2/1922 | Browning | C22B 3/44 423/563 |
| 2008/0028995 A1 | * | 2/2008 | Barlet-Gouedard | C04B 28/006 427/230 |
| 2009/0071897 A1 | * | 3/2009 | Ollivier | C02F 3/345 210/603 |
| 2010/0135878 A1 | * | 6/2010 | Shibayama | C22B 23/0461 423/150.1 |
| 2019/0010049 A1 | * | 1/2019 | Jalbout | B01J 19/1862 |
| 2019/0262769 A1 | * | 8/2019 | Jackson | B01D 53/8603 |

FOREIGN PATENT DOCUMENTS

| | | | | | |
|---|---|---|---|---|---|
| CA | 2 288 645 A1 | * | 12/1999 | | C10L 3/10 |
| CN | 111892148 A | * | 11/2020 | | C02F 1/62 |
| DE | 4244438 A1 | * | 6/1994 | | G01N 27/4163 |
| DE | 19718923 C2 | * | 7/2001 | | C12N 1/20 |
| JP | 55002765 A | * | 1/1980 | | |
| KR | 101820350 B1 | * | 1/2018 | | C04B 18/08 |
| WO | WO 2015/191962 A1 | * | 12/2015 | | B01J 20/18 |
| WO | WO 2019/191249 A1 | * | 10/2019 | | C01B 17/16 |

* cited by examiner

*Primary Examiner* — Timothy C Vanoy
(74) *Attorney, Agent, or Firm* — University of Arizona IP Clinic

(57) ABSTRACT

Method and apparatus pertaining to the production of hydrogen sulfide using sodium salts recycle. Sodium sulfate is reacted with a carbon containing stream to produce sodium sulfide and carbon dioxide. The sodium sulfide is blended with elemental sulfur and water. The blend is subjected to elevated temperatures and pressures to result in the production of hydrogen sulfide and sodium sulfate. A mixing apparatus, such as a bubble column reactor, has been found to be especially useful. The hydrogen sulfide can be used for removing metal from effluents.

22 Claims, 5 Drawing Sheets

Efficiency of reaction Gas-Liquid-Solid

Parameters

| Vol. column | 130 L |
|---|---|
| TRH | 15-20 min |
| Q aqueous | 7 L/min |

Bubble size

PRODUCTION OF H2S FOR EFFICIENT METAL REMOVAL FROM EFFLUENTS

CROSS-REFERENCE TO RELATED APPLICATIONS

This application claims priority to Provisional Application No. 63/081,585 filed on Sep. 22, 2020, and to provisional Application No. 63/014,947 filed on Apr. 24, 2020, the content of both of which are hereby incorporated by reference.

BACKGROUND OF THE DISCLOSURE

Hydrogen sulfide is a chemical compound with the formula $H_2S$. At room temperature, it is a colorless, flammable and extremely dangerous gas with the characteristic foul odor of rotten eggs. Chemically, hydrogen sulfide acts as a reducing agent, and reacts with metal ions to form metal sulfides, which may be considered the salts of hydrogen sulfide. In addition, the naturally occurring mineral form of several metals are sulfides (e.g., galena, or lead(II) sulfide and sphalerite, or zinc sulfide).

In regards to health, hydrogen sulfide is both an irritant and a chemical asphyxiant which affects oxygen utilization and the central nervous system. At lower concentrations (2-5 ppm), this can cause nausea, tearing of the eyes, headaches and/or loss of sleep. Higher concentrations (5-100 ppm) can cause more severe eye and respiratory irritation. At higher concentrations, (100+ ppm) it can cause shock, convulsions, inability to breathe, extremely rapid unconsciousness, coma and death.

As far as the mining industry, hydrogen sulfide is used in the preparation of metal sulfides and removal of impurities in metallurgical processes. This process is described, for example, in the online article entitled Biological Hydrogen Sulfide Production, available at www.911metallurgist.com/biological-hydrogen-sulfide-production/.

Often in industries (e.g., mining industries, sulfuric acid factories) diluted streams of sulfuric acid, contaminated with metals have to be treated. These streams in the past have been neutralized using limestone or other alkalinic components, resulting in the precipitation of sulfates and metals such as gypsum and metal hydroxides, respectively, which have to be landfilled. In addition, all valuable metals are lost in the sludge. With biogenic sulfide production, these contaminated streams can be treated to produce sulfur and metal sulfides. Metals present in the waste acid bleed used as a source for hydrogen sulfide production will precipitate as metal sulfides based on:

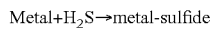

However obtained, hydrogen sulfide can be very costly to produce because of the dangers involved in production, and because of the hazards it poses to human health. What is needed is a cost-effective method of producing industrial-scale quantities of hydrogen sulfide that eliminates the need for expensive reagents such as pure hydrogen, ethanol or natural gas.

Additionally, it would be advantageous to produce hydrogen sulfide in a process that is thermodynamically favored such that the rate of production can be controlled by controlling the temperature of the reaction vessel.

There are major mining companies which have concentrator plants for which sodium hydrosulfide (NaHS) is widely used during separation of the copper/molybdenum. It is shown that at this stage you can use either sodium hydrosulfide (NaHS), sodium sulfide ($Na_2S$) or directly hydrogen sulfide ($H_2S$) when any of the substitutes reagents (NaHS or $Na_2S$) is fed, the final product is $H_2S$.

NaHS used by major mining companies at its mines in Mexico for example generally are imported from the USA by rail, which has the disadvantage of being very expensive, difficult to manage as well as remoteness. These mining companies could use $H_2S$ directly in their process and in this case there is great interest in on-site production technology.

BRIEF SUMMARY OF THE INVENTION

In view of the foregoing disadvantages inherent in its production, embodiments described herein provide an innovative, efficient, and fast process to produce hydrogen sulfide on-site.

In some embodiments, processes are described that provide a safe, cost-efficient method for producing hydrogen sulfide used for the precipitation of metal that are in solution. The hydrogen sulfide can be produced on-site to eliminate the need for transporting thus reducing costs and removing an element of danger.

In some embodiments, the hydrogen sulfide is used for the extraction of metals in liquid streams, containing at least one metal, whereby the gaseous hydrogen sulfide is fed into a mixing apparatus containing the liquid stream and mixed under conditions sufficient to extract the at least one metal.

In one embodiment of the process, a stream of concentrated $Na_2SO_4$ is combined with a stream of natural gas into a converter at a temperature of about 1050° C. The preferred product is $Na_2S$. In the same embodiment, the preferred product is directed into a prep tank, into which an appropriate amount of water is injected to prepare an appropriate stoichiometric solution. The solution is then pressurized using a high-pressure pump. This stream is then blended with another water stream, which is specifically incorporated to facilitate heat recovery of reaction products using an interchange device. The $Na_2S$ and water stream then flows through a heater and into the $H_2S$ reaction system. A sulfur stream is blended with a recycle sulfur stream. A composite of these two streams is then pumped into a sulfur tank. The sulfur will melt inside the $H_2S$ reactor. This elemental molten sulfur is pumped out and directed into the $H_2S$ reaction system.

In an alternate embodiment the preferred product is directed into an agitated $Na_2S$ solution and sulfur slurry prep tank. Finely ground, comminuted elemental sulfur is pneumatically transported into the prep tank. A recycle sulfur stream, is also continuously blended into the slurry pump tank. A stream of water emanating from interchanger is also continuously introduced into the prep tank. The product from the $Na_2S$ solution and sulfur slurry prep tank is pressurized using a high-pressure pump. High pressure slurry solution stream then flows through an interchange where it picks up any available heat from the stream that is flowing into the prep tank. The warmed slurry solution stream then flows through a heater, that brings the entire stream up to the necessary temperature for initiating and conducting the downstream reactions. The $Na_2S$-sulfur/water stream is directed to flow into the first $H_2S$ reactor.

These and other aspects of the embodiments herein are further described in the following figures and detailed description. However, the claims are not intended to be limited by such figures and description.

DETAILED DESCRIPTION OF THE INVENTION

Figure 1:
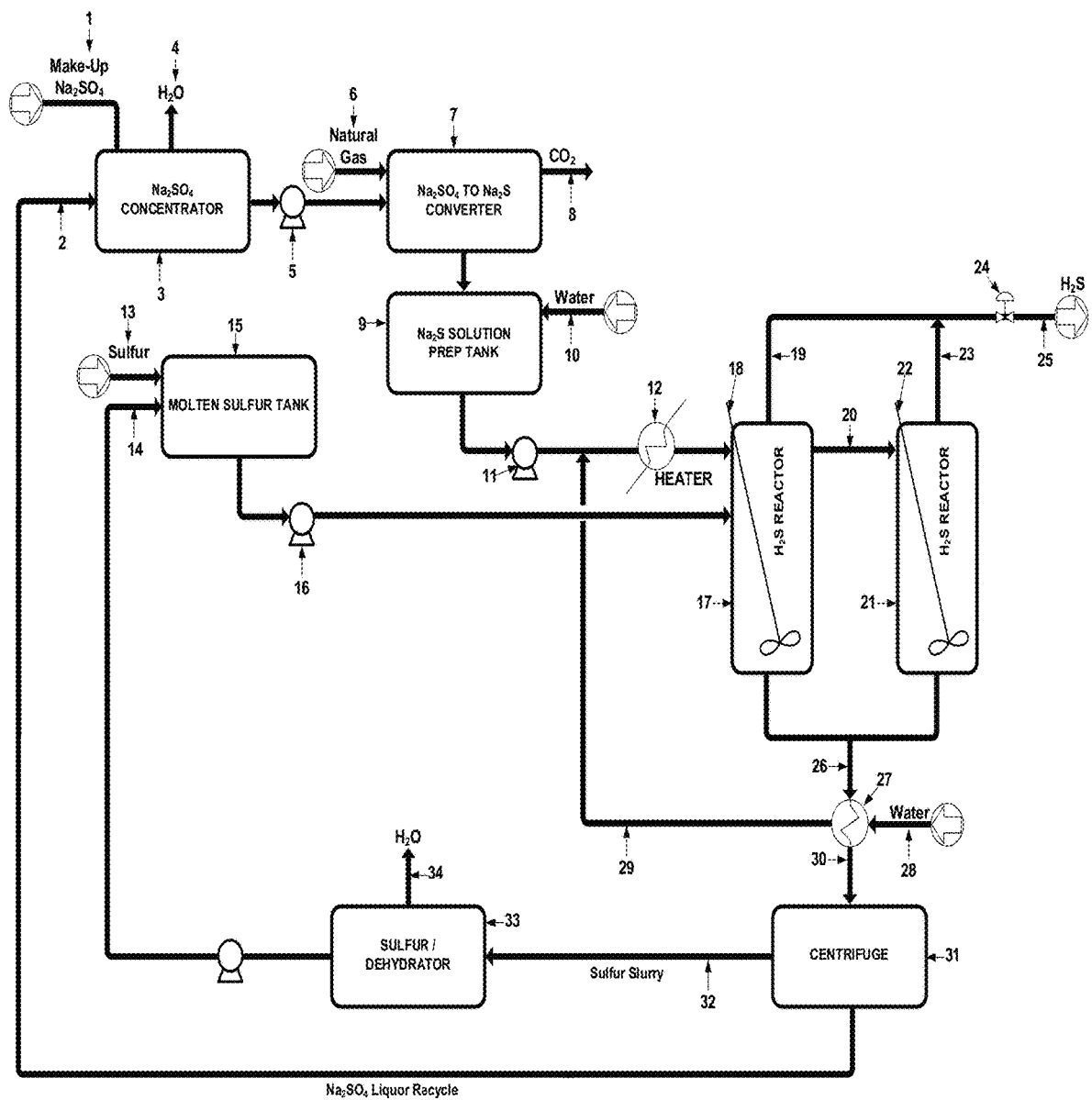
FIG. 1 is an embodiment of recycling/production process.

In one embodiment, as represented in FIG. 1, a make-up stream, 1, of $Na_2SO_4$ is combined with a $Na_2SO_4$ liquor recycle stream, 2, and directed into a $Na_2SO_4$ concentrator, 3. The concentrator is designed to extract a significant amount of water, 4, that increases the concentration of $Na_2SO_4$. This concentrate stream is then directed through a pump, 5, into the next unit operation. Natural gas, 6, is also permitted to flow in conjunction with the $Na_2SO_4$ concentrate. These two streams are directed into a $Na_2SO_4/Na_2S$ converter, 7, which operates at high temperatures of about 1000-1100° C., where "about" is defined as +/−10%. The natural gas provides the carbon source for the conversion reaction whereby $Na_2S$ becomes the preferred product. A stream of $CO_2$, 8, is produced as a co-reaction product and is sent to the vent stack.

The $Na_2S$ is directed into a prep tank, 9, into which an appropriate amount of water, 10, is injected to prepare an appropriate stoichiometric solution. This solution is then pressurized using a high-pressure pump, 11. This stream is then blended with another water stream, 29, which is specifically incorporated to facilitate heat recovery of reaction products using an interchanger device. This $Na_2S$ and water stream then flows through a heater, 12, and into the $H_2S$ reaction system.

A sulfur stream, 13, is blended with a recycle sulfur stream, 14. A composite of these two streams is then pumped into a sulfur tank, 15. The sulfur will melt inside the $H_2S$ reactor. There is no need to maintain a sulfur temperature of about 120° C. outside of the reactor. This elemental molten sulfur is pumped out using a jacketed high pressure positive displacement pump, 16, and directed into the $H_2S$ reaction system.

The $Na_2S$-water stream and the molten elemental sulfur stream are directed to flow into the first $H_2S$ reactor, 17. This reactor is equipped with an agitation device, 18, that ensures the maintenance of finally dispersed sulfur in the $Na_2S$-water medium. The $H_2S$ reactor operates at a temperature of 200-250° C. and a service pressure between 20-50 bar. The $H_2S$, which is a product of the reaction, leaves the reactor through line 19. The $H_2S$ reactor, 17, is configured to work in a cascade mode where the overflow from this reactor is directed into the next reactor through line 20. This $H_2S$ reactor, 21, as noted is working in a cascade mode using the overflow from the first reactor, 17. This reactor is also equipped with an agitation-dispersion device, 22, which ensures homogeneity of the reaction. Hydrogen sulfide, the reaction product, leaves through line 23. The merged $H_2S$ lines from reactor 17 and 21 flows through a backpressure control valve, 24. The depressurized $H_2S$ stream, 25, is then piped for its appropriate use.

The hot liquids leaving the two $H_2S$ reactors are combined as stream, 26. This stream primarily comprises of $Na_2SO_4$, a small amount of unreacted $Na_2S$, unreacted sulfur and unreacted water. It first flows through the tube side of a heat interchanger, 27. Water, stream 28, flows through the shell side of this interchanger to maximize the pick-up of heat. This hot water stream 29, is redirected back into the $H_2S$ reactor cascading system. The cooled reactor effluent stream, 30, then flows into a centrifuge that is specifically designed to separate the sulfur slurry component from the $Na_2SO_4$ liquor component. The sulfur slurry component, 32, is then sent into a dehydrator, 33, where the water is boiled out as stream 34 leaving behind sulfur in a molten condition. This sulfur is pumped back into the main sulfur tank, 15.

Figure 2:
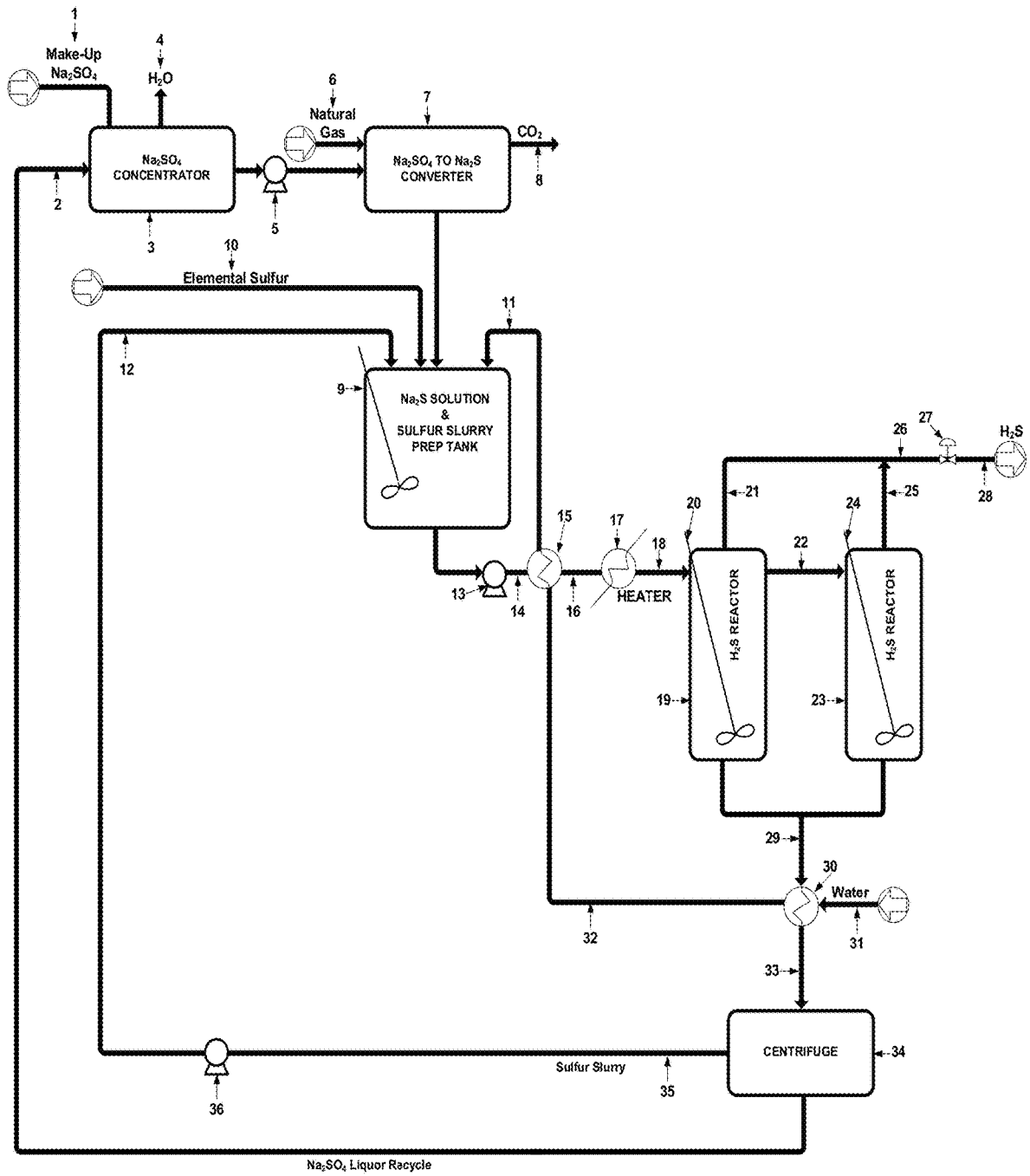
FIG. 2 is an alternate embodiment of a recycling/production process.
Figure 3:
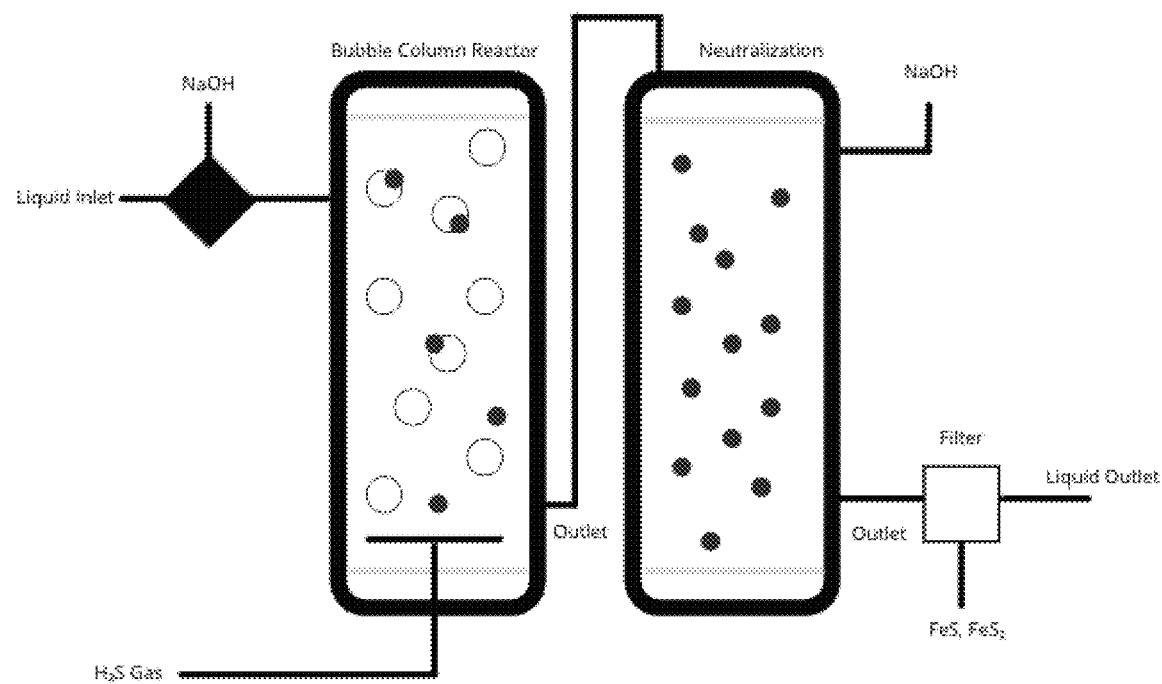
FIG. 3 displays a basic flow process.
Figure 4:
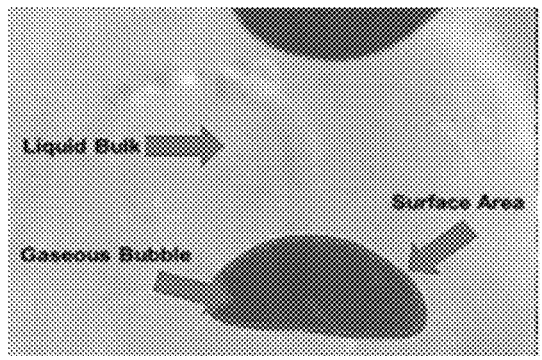
FIG. 4 represents details of a feed system ($H_2S$).
Figure 5:
FIG. 5 displays the effect of bubble size.
Figure 6:
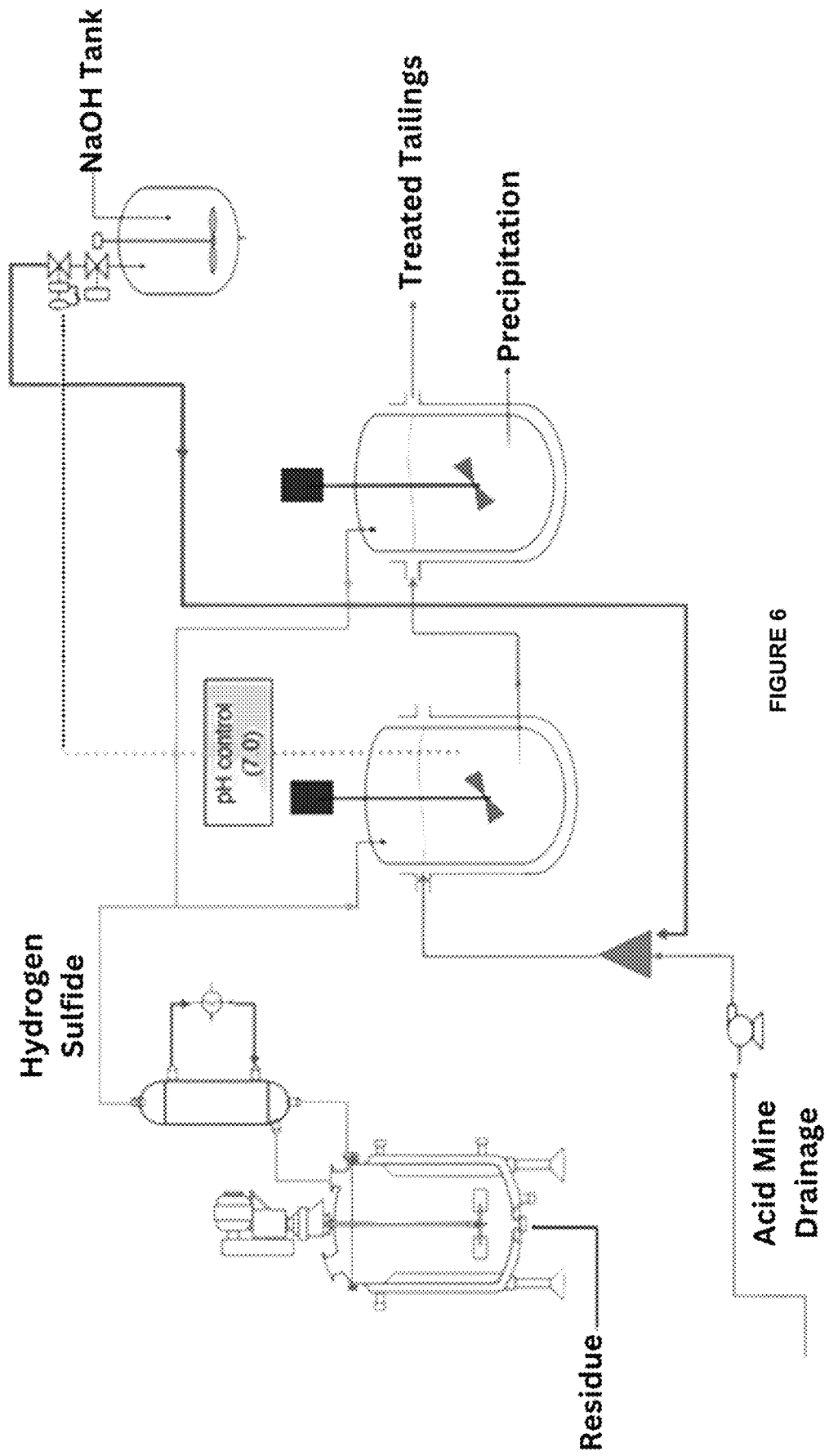
FIG. 6 is a diagram showing a $H_2S$ precipitation process.

Leaving the centrifuge, 31, is the $Na_2SO_4$ liquor recycle stream, 2, that is directed to the $Na_2SO_4$ concentrator. This stream undergoes concentration and flows into the $Na_2SO_4$ to $Na_2S$ converter that closes the sodium salt recycle loop. In another embodiment, as represented in FIG. 2, a make-up stream, 1, of $Na_2SO_4$ is combined with a $Na_2SO_4$ liquor recycle stream, 2, and directed into a $Na_2SO_4$ concentrator, 3. The concentrator is designed to extract a significant amount of water, 4, that increases the concentration of $Na_2SO_4$. This concentrate stream is then directed through a pump, 5, into the next unit operation. Natural gas, 6, is also permitted to flow in conjunction with the $Na_2SO_4$ concentrate. These two streams are directed into a $Na_2SO_4/Na_2S$ converter, 7, which operates at high temperatures of around 1000-1100° C. The natural gas provides the carbon source for the conversion reaction whereby $Na_2S$ becomes the preferred product. A stream of $CO_2$, 8, is produced as a co-reaction product and is sent to the vent stack or, in some embodiments, the $CO_2$ is captured by a geopolymer based material and may be used to activate the geopolymer based material. Geopolymers are inorganic, typically ceramic, alumino-silicate forming long-range, covalently bonded, non-crystalline (amorphous) networks. Typical examples of a geopolymer material includes raw materials used in the synthesis of silicon-based polymers that are mainly rock-forming minerals of geological origin.

The $Na_2S$ is directed into an agitated $Na_2S$ solution and sulfur slurry prep tank, 9. Finally ground, comminuted elemental sulfur, 10, is pneumatically transported into the prep tank, 9. A recycle sulfur stream, 12, is also continuously blended into the slurry pump tank, 9. A stream of water emanating from interchanger 15 is also continuously introduced into the prep tank. The product from the $Na_2S$ solution and sulfur slurry prep tank is pressurized using a high-pressure pump, 13. High pressure slurry solution stream, 14, then flows through an interchanger, 15, where it picks up any available heat from the stream, 11, that is flowing into the prep tank. The warmed slurry solution stream, 16, then flows through a heater, 17, that brings the entire stream up to the necessary temperature for initiating and conducting the downstream reactions.

The $Na_2S$-sulfur/water stream is directed to flow into the first $H_2S$ reactor, 19. This reactor is equipped with an agitation device, 20, that ensures the maintenance of finally dispersed sulfur in the $Na_2S$-water medium. The $H_2S$ reactor operates at a temperature of 200-250° C. and a service pressure between 20-50 bar. The $H_2S$, which is a product of the reaction, leaves the reactor through line 21. The $H_2S$ reactor, 19, is configured to work in a cascade mode where the overflow from this reactor is directed into the next reactor through line 22. This $H_2S$ reactor, 23, as noted is working in a cascade mode using the overflow from the first reactor, 19. This reactor is also equipped with an agitation-dispersion device, 24, which ensures homogeneity of the reaction. Hydrogen sulfide, the reaction product, leaves through line 25. The merged $H_2S$ lines from reactors 19 and 23 consolidate as line, 26 and flow through a backpressure control valve, 27. The depressurized H₂S stream, 28, is then piped for its appropriate use.

The hot liquids leaving the two H₂S reactors are combined as stream, 29. This stream primarily comprises of $Na_2SO_4$, a small amount of unreacted $Na_2S$, unreacted sulfur and unreacted water. It first flows through the tube side of a heat interchanger, 30. Water, stream 31, flows through the shell side of this interchanger to maximize the pick-up of heat. This hot water stream, 32, is directed to the interchanger, 16, and from there becomes line 11 that flows into the prep tank, 9. The cooled reactor effluent stream, 33, then flows into a centrifuge, 34, that is specifically designed to separate the sulfur slurry component from the $Na_2SO_4$ liquor component. The sulfur slurry component, 35, is then recycled using pump, 36, and becomes stream 12 that flows into prep tank, 9.

Leaving the centrifuge, 34, is the $Na_2SO_4$ liquor recycle stream, 2, that is directed to the $Na_2SO_4$ concentrator. This stream undergoes concentration and flows into the $Na_2SO_4$ to $Na_2S$ converter that closes the sodium salt recycle loop.

NON-LIMITING EXAMPLES

In one embodiment the hydrogen sulfide is generated electrochemically. Generating H₂S in an electrochemical reactor whereby one can:
1. put elemental sulfur in a protic ionic liquid (like pyridinium phosphate) and heat to T>90 C to melt the sulfur;
2. insert a cathode made of platinum or copper or steel or graphite;
3. insert a hydrogen anode (like hydrogen bubbled into a container with an inert anode inside an inverted Teflon cup. The anode inside the cup could be platinum wire or a dimensionally stable anode (DMA, which is Ru-oxide on titanium) or platinized graphite (platinum plated on graphite paper), etc.;
4. A power supply is connected with the negative electrode connected to the cathode and the positive terminal connected to the anode; and
5. as current passes sulfur should form H₂S at the cathode as shown below:

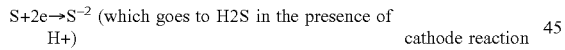
cathode reaction and hydrogen should form proton at the anode

anode reaction so the net reaction is

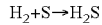

Hydrogen can be from tank hydrogen or can be made on demand by the electrolysis of water by controlling current. With adequate H₂ then H₂S should also be supplied on demand by controlling the current.

In another embodiment the hydrogen sulfide can be produced using bio-reactors and feed into a mixing system or apparatus.

In another embodiment, use of proprietary bubble column reactors (BCR) can be done. In an example of its operation, an acid mine effluent has been tested at a site, with an average flow rate of 100 m3/day, and a concentration of 720 ppm of Fe, 21 ppm of Cu and 258 ppm of Zn at pH 2.5. The purpose of this setup was to try to reduce the concentration of metals and neutralization of the effluent. This is accomplished by producing H₂S through a plant.

In one embodiment, hydrogen sulfide and dosing in BCR columns with the following operating conditions of the plant is performed:
Cond. Operation
Temperature 160-200° C.
Pressure 100-200 psi
H2S flow 10-30 L/min
The conditions of the BCR columns is:
Number of Columns 20
Effluent flow 100-150 m3/day
Dosage H2S 10-30 L/min
Effluent pH treated 6-7

Example 1: Design of Reactor

Capacity of 150 Kg/day H2S (Sufficient capacity to treat effluent, 20% excess)
2 batch reactors made of Ni alloy
Internal nickel coating and graphite seals
316L alloy capacitor
9000 watt heating system
Temperature and pressure safety system
Semi-automatic instrumentation and control
Compact modular installation, surface 2.0×3.2 m Example 2: Design of BCR Columns 20 columns maximum treatment capacity of 150 m3/day
Control and Instrumentation
Compact modular installation, surface 1.5×6.5 m or 1 Multi filter bag housing BFS
Reagent pumping and dosing system operational details:
Operation: Continous
Effluent Fluid: 7 L/min.
pH-rxc: 4-7 (NaOH)
Neutralization pH 7
[Fe]ini, (mg/L): 720
[Cu]i ni, (mg/L): 21
[Zn] ini, (mg/L): 257

I claim:
1. A method to extract metals in a liquid stream containing at least one metal, comprising the steps of:
flowing gaseous hydrogen sulfide (H₂S) into a mixing apparatus containing the liquid stream; wherein
the gaseous hydrogen sulfide and the liquid stream are mixed under conditions sufficient to extract the at least one metal, and wherein a make-up stream of $Na_2SO_4$ is combined with a $Na_2SO_4$ liquor recycle stream and directed into a $Na_2SO_4$ concentrator to extract water to thereby increase a $Na_2SO_4$ concentration, and the concentrated $Na_2SO_4$ is then directed through a pump into a $Na_2SO_4/Na_2S$ converter and natural gas flows in conjunction with the $Na_2SO_4$.
2. The method of claim 1, whereby the mixing apparatus is comprised of one or more bubble column reactors.
3. The method of claim 1, whereby the hydrogen sulfide (H₂S) gas is produced electrochemically.
4. The method of claim 1, wherein the converter operates at a temperature from about 1000° C. to about 1100° C.
5. The method of claim 1, wherein $Na_2S$ is produced and a by-product is $CO_2$.
6. The method of claim 5 wherein the $CO_2$ is captured by a geopolymer based material.
7. The method of claim 5 wherein the $CO_2$ is used to activate a geopolymer based material.

8. The method of claim 1, wherein the Na$_2$S is directed into a prep taken along with an appropriate amount of a water for a stoichiometric solution.

9. The method of claim 8 wherein a pump is used to pressurize the solution.

10. The method of claim 9 wherein the stream is blended with another water stream configured to facilitate heat recovery of reaction products.

11. The method of claim 10 wherein the heat recovery is facilitated using an interchanger device.

12. The method of claim 10 wherein the blended stream flows through a heater and into a first H$_2$S reactor along with a molten elemental sulfur stream.

13. The method of claim 12 wherein the molten elemental sulfur is produced by blending a sulfur stream and a recycle sulfur stream then pumping the composite of these two streams into a sulfur tank.

14. The method of claim 12 wherein the molten elemental sulfur is pumped out of the sulfur tank using a jacketed positive displacement pump and directed into the first H$_2$S reactor.

15. The method of claim 12 wherein the first H$_2$S reactor is equipped with an agitation or mixing device.

16. The method of claim 15 wherein the agitation or mixing device comprises a bubble column reactor.

17. The method of claim 12 wherein the first H$_2$S reactor operates at a temperature of about 100° C. to about 250° C. and a service pressure of about 20 bar to 50 bar.

18. The method of claim 12 wherein the first H$_2$S reactor is configured to work in cascade mode where the overflow from the first reactor is directed into a second reactor.

19. The method of claim 18 wherein the second reactor is also equipped with an agitation or mixing device; and operates at about the same temperature and pressure as the first reactor.

20. The method of claim 12 wherein each of the first and second reactors produces hydrogen sulfide.

21. The method of claim 1 whereby a bioreactor is used to generate H$_2$S.

22. A method to extract metals in a liquid stream containing at least one metal, comprising the steps of:

flowing gaseous hydrogen sulfide (H$_2$S) into a mixing apparatus containing the liquid stream and comprised of one or more bubble column reactors; wherein the gaseous hydrogen sulfide and the liquid stream are mixed with natural gas in conjunction with Na$_2$SO$_4$ under conditions sufficient to extract the at least one metal.

* * * * *